March 5, 1957 R. R. CARAWAY 2,783,601
REEL TYPE MOWER WITH POWER DRIVING ATTACHMENT
Filed April 28, 1955 2 Sheets-Sheet 1
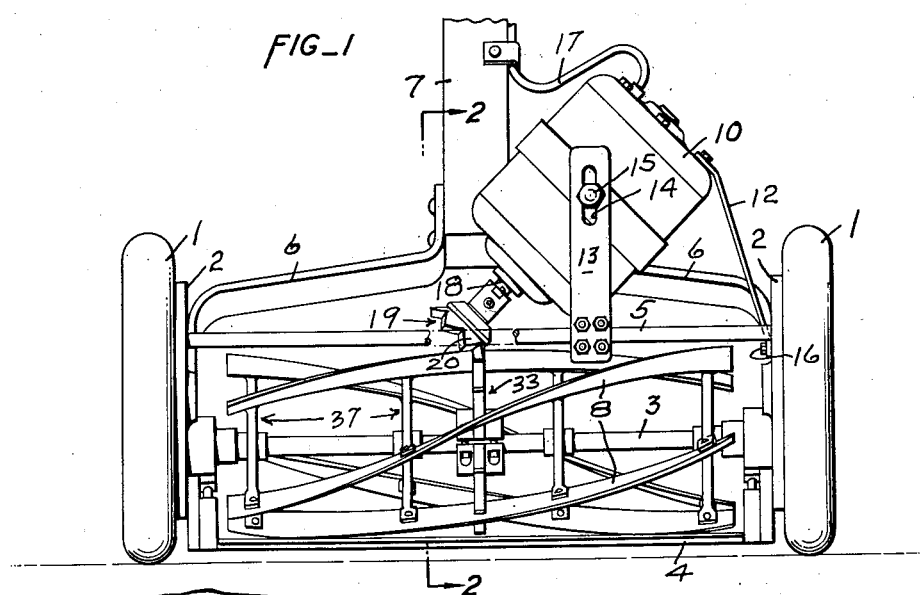
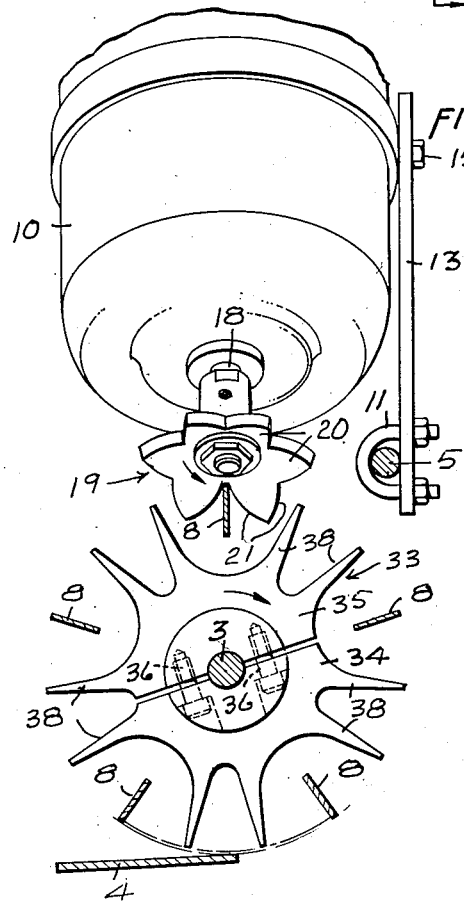
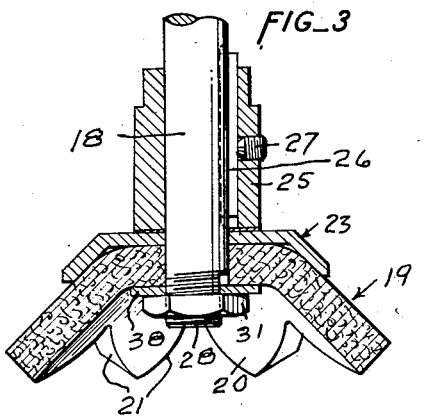
INVENTOR.
ROBERT R. CARAWAY
BY
Boyken, Mohler & Wood
ATTORNEYS March 5, 1957    R. R. CARAWAY    2,783,601
REEL TYPE MOWER WITH POWER DRIVING ATTACHMENT
Filed April 28, 1955    2 Sheets-Sheet 2
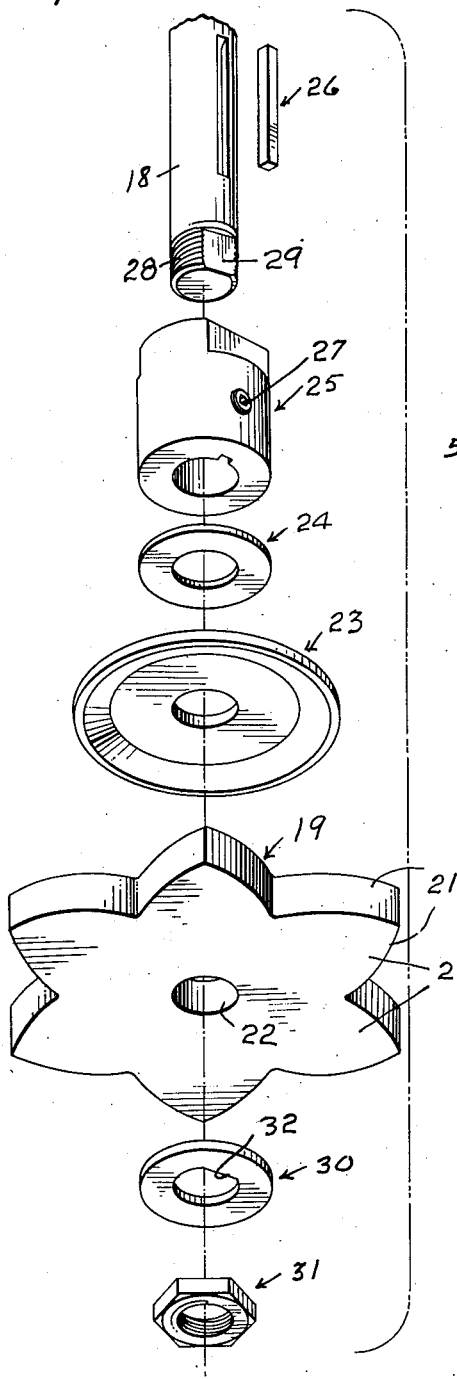
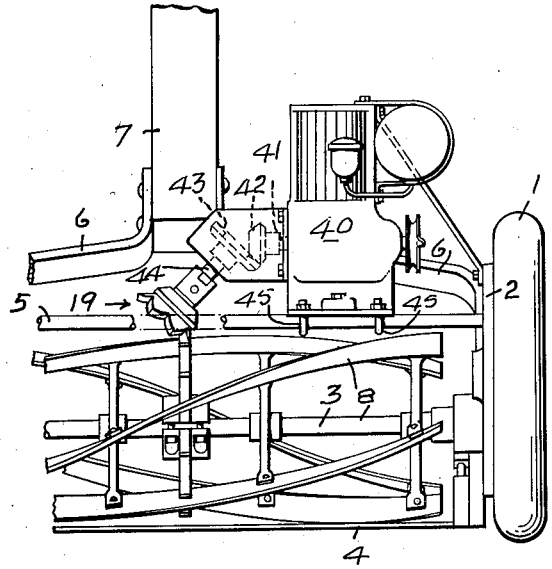
INVENTOR.
ROBERT R. CARAWAY
BY
Boyken, Mohler & Wood
ATTORNEYS

United States Patent Office 2,783,601
Patented Mar. 5, 1957

2,783,601

REEL TYPE MOWER WITH POWER DRIVING ATTACHMENT

Robert R. Caraway, San Carlos, Calif.

Application April 28, 1955, Serial No. 504,629

11 Claims. (Cl. 56—26)

This invention relates to a motor driven lawnmower and to a power attachment unit for converting an ordinary lawnmower into a power driven lawnmower.

One of the objects of the invention is the provision of a simple and relatively inexpensive attachment for converting a common manually operated lawnmower into a motor driven lawnmower.

A still further object of the invention is the provision of means for applying the power from said motor directly to the helically extending cutting blades of a lawnmower.

A still further object of the invention is the provision of simple means for easily converting an ordinary manually actuated lawnmower into one in which the cutting blades are motor driven.

The ordinary manually driven or operated lawnmower consists of a pair of ground wheels that include internal toothed spur gears coaxial therewith, the teeth of which are in mesh with the teeth of coaxial inside gears that, in turn, are on the ends of the shaft that supports the cutting blades. A stationary backing plate at the opposed sides of the ground wheels has bearings supporting the ends of said shaft and a cross bar parallel with said shaft and above said blades connects said backing plate. The shear plate for said blades and the handle of the mower also connect said plates.

The cutting blades are helically extending around the rotary shaft and are equally spaced from each other and from the axis of said shaft.

Attempts to drive the general arrangement above described have usually been directed toward driving the ground wheels directly or through an auxiliary shaft having an internal gear in mesh with the gear on each wheel, however, such efforts require considerable modification of the mower and also a relatively powerful motor.

With the present invention, the blades themselves are adapted to cooperate with toothed sections for forming a gear having equally spaced teeth that may be driven by a motor. Thus the blades are directly driven by the motor.

Other objects and advantages will be obvious from the description and the drawings.

In the drawings, Fig. 1 is a front view of a lawmower showing the motor and driving means thereon;

Fig. 2 is an enlarged sectional view taken along line 2—2 of Fig. 1;

Fig. 3 is an enlarged fragmentary central sectional view of the special gear for driving the blades;

Fig. 4 is an exploded isometric view of the gear of Fig. 3 and the parts associated therewith separate from the shaft that mounts the gear; and, Fig. 5 is a modified fragmentary view similar to that of Fig. 1, but showing a gasoline motor instead of an electric motor.

In detail, the ordinary manually operated lawnmower shown in Fig. 1 (and in Fig. 5) comprises a pair of opposed ground wheels 1. At oppositely facing sides of said wheels are stationary backing plates 2 that support wheels 1. Gears (not shown) including the usual ratchet or overrunning clutch, connect the wheels with the ends of a shaft 3. Shaft 3 is rotatably supported at its ends by the backing plates 2, and usually has a pinion on each end, but in the present instance these pinions are removed so that shaft 3 is rotatable without any driving connection with wheels 1. A stationary shear plate or blade 4 is connected at the ends with the backing plates and is spaced below shaft 3 to a point adjacent to the ground. Also a cross bar 5 is above shaft 3 and is usually offset to a position forwardly of shaft 3. Arms 6 on the ends of handle 7 are connected with the backing plates.

Horizontally extending cutting blades 8 extend helically relative to shaft 3, and about the axis of said shaft, which blades are equally spaced from each other and from said shaft. Said blades are relatively widely spaced apart, and may be, say five, in number, as shown (Fig. 2).

The foregoing is a description of a conventional lawnmower except that there is no driving connection between shaft 3 and wheels 1.

With the present invention, a motor 10 is provided, which motor may be supported by clamp 11 (Fig. 2) that, in turn, adjustably engages the rod 5, and one or more bracket arms 12 (Fig. 1) may extend from motor 10 to one of the backing plates 2.

An arm 13 extending from clamp to motor 10 connects the clamp with the motor. This clamp is adjustable along and about the bar 5, and may be tightened at any desired point, and the arm 13 may have a slot 14 (Fig. 1) formed therein through which a bolt 15 on the motor may extend for tightening said bolt at any point along the slot. By this structure the motor may be adjusted to any desired position horizontally and vertically and about the axis of bolt 15 and the axis of shaft 5.

As seen in Fig. 1, the motor 10 is at an incline with its shaft extending toward the outer edges of the cutting blades 8.

The lower end of bracket 12 may be apertured for a bolt 16 (Fig. 1) that, in turn, may be secured to the backing plate 2.

A cord 17 having any suitable switch (not shown) therein may extend along handle 7 to the operator with such switch accessible to one hand or the other of the operator.

The end of motor shaft 18 (Fig. 3) that is adjacent to the cutting blades 8, carries a special gear 19.

This gear is preferably formed of fabric or other suitably reinforced rubber or synthetic rubber such as belting and is initially stamped or cut from a belt and is flat as seen in Fig. 4.

The teeth 20 of said gear each have convexly curved sides 21 meeting at their outer ends and with the adjacent sides of the teeth of each pair adjoining at the base of the teeth. In the particular attachment illustrated in the drawings, the gear has six teeth, and a central aperture 22 (Figs. 2, 4) through which shaft 18 extends.

At the side of the gear 19 that is adjacent to the motor, is a centrally apertured circular disked plate 23 having its recessed side facing the gear and the outer periphery of said plate being at about the root ends of the teeth 20.

Next to plate 23 (in direction toward the motor) is a washer 24, and next to the washer is a sleeve 25 that is adapted to be keyed to the shaft 18 by a key 26 so as to rotate with the shaft. A set crew 27 holds the sleeve against axial movement on the shaft.

The outer end of shaft 18 is threaded as at 28, and said outer end has a flattened side 29. This outer end projects from the side of the gear 19 that is outwardly of the motor.

In installing the gear, the sleeve 25 is first secured in its proper position on the shaft, and this position is such that when the washer 24, plate 23 and gear 19 are on the shaft 18, the gear must be dished to correspond generally to the dishing of the plate 23 when a washer 30 and nut 31 are successively positioned on the outer end of shaft 18. The washer is apertured to provide a straight edge 32 adapted to conform to the flat side 29 of the outer end of the shaft so that said washer 30 will rotate with the shaft. When nut 31 is tightened on the shaft, the gear will be dished to the desired degree due to forcing the central portion of the gear into the dished side of plate 23. The teeth 20 will then extend obliquely outwardly away from motor 10 and will generally resemble a bevel gear except that its teeth each have convexly rounded sides meeting at their outer ends with their bases relatively broad.

By this structure, it will be seen that any obstruction to rotation of the gear 19 with the shaft will result in a slippage between the shaft and gear 19. The degree of resistance to such slippage depends to a great degree upon the tightness of nut 31 since this regulates the degree of pressure on the gear. By permitting the gear to slip on the shaft and relative to washers 24, 32, breakage of the shaft 18 or stalling of the motor is prevented.

Secured on shaft 3 is a special gear 33 that is preferably in two sections 34, 35 adapted to be bolted together by bolts 36 for clamping on said shaft 3 (Fig. 2).

This gear 33, when so bolted on the shaft 3, is preferably at a point about centrally between the ends of the blades 8. Spiders 37 (Fig. 1) normally secure the blades 8 to shaft 3.

This gear 33 has its teeth 38 arranged in pairs that are equally spaced from each other a distance equal to substantially double the distance between the teeth of each pair, and where there are five cutting blades 8, there will be five pairs of teeth 38.

These teeth 38 are preferably relatively long and slender so as to offer no obstacle to grass that is cut and their length is such as to extend to substantially the circle in which the outer cutting edges of the blades 8 are disposed and which circle is in a plane normal to the axis of shaft 3 (Fig. 2). Of course the outer ends of teeth 38 will not strike the shear plate 4, although it may come as close to said plate as possible without striking it.

The gear 33 is secured on shaft 3 so that a blade 8 will be at a point exactly midway between the adjacent teeth 38 of each adjacent pair of the latter, so that the blade 8 in combination with teeth 38 will provide equally spaced teeth for meshing with the teeth of gear 19.

The special form of the teeth 20 of gear 19 enables one of each of the teeth 20 to be in continuous driving engagement with one of the blades 8, and the fact that gear 19 is of relatively soft composition material not only provides a quiet driving connection between the motor 10 and the blades 8 and gear 23, but there is no objectionable wear on the blades or on gear 33, and, as has already been mentioned, the flexibility of gear 19 enables the operation to provide the proper angular positioning of teeth 20 and to provide the desired degree of functional insistence to rotation of the shaft 3 relative to said gear should a stone, branch or other obstacle be caught between a blade 8 and the shear plate 4.

In Fig. 5, a gasoline motor 40 provides the power. In the drawing such a motor has a horizontal drive shaft 41 that may be connected by gears 42, 43, with an inclined shaft 44 that carried gear 19 therein in the same position as in Fig. 1. The motor 40 is carried on bar 5 being secured thereto by a pair of clamps 45, and a bracket arm or brace 46 also connects the motor with the backing plate 2 in the same manner as the bracket arm or brace 12 connects motor 10 with the backing plate.

The motor 40 may be of any suitable type. Neither motor 10 nor motor 40 need be particularly powerful since they drive the wheels 1 from the high speed end of the train at which end the least power is required.

From the foregoing it will be seen that the motor and gear 20 and the gear 33 together with means for securing them onto a conventional lawnmower, may be made and sold as an attachment, or the foregoing elements may be made and sold in combination with the mower. In any event, the means providing the driving connection between the motor and blades without providing a structure that would flatten the grass or that would require a special train of gear separate from the mower blades, is a very important feature of the invention. This, of course, includes structure whereby the blades themselves become teeth in a gear and a motor driven pinion coacts with such gear to drive the same.

It should also be pointed out that in the accomplishment of the above results it is important that the spacing between certain adjacent teeth of gear 33 is greater than the spacing between the adjacent teeth of the pinion 19 by a distance that is a multiple of the distance between the adjacent teeth of the pinion. This enables the blades to provide the missing teeth so that each tooth on the pinion will drive either a tooth or gear 33 or a blade 8.

In the claims the use of the term "certain of the adjacent teeth," referring to the teeth of gear 33, may not necessarily be less than all of the teeth, since it is conceivable that a reduction of the spacing between the teeth 8 by employing a greater number of blades might make possible the use of equally spaced teeth on gear 33, although such structure would naturally reduce the efficiency of the mower in relatively long grass.

It is to be understood that the drawings and detailed description are merely illustrative of a preferred form of the invention and are not intended to be restrictive of said invention.

I claim:

1. An attachment for a lawnmower having a central rotary shaft supporting a plurality of elongated blades providing radially outwardly directed helically extending edges equally spaced from each other around and spaced outwardly of said shaft comprising: a gear providing spaced teeth to be driven, means for securing said gear rigid with such shaft coaxial therewith, a power driven pinion having equally spaced teeth, the spacing between certain of the adjacent teeth on said gear being greater than the spacing between the adjacent teeth of said pinion by a distance equal to a multiple of the distance between the teeth of each adjacent pair thereof on said pinion, and means for supporting said pinion on a lawn mower with its teeth in a position for meshing with the blades of such mower.

2. An attachment for a lawnmower having a central rotary shaft supporting a plurality of elongated blades providing radially outwardly directed helically extending edges equally spaced from each other around and spaced outwardly of said shaft comprising: a gear providing a plurality of equally spaced sets of spaced teeth, means for securing said gear rigid with such shaft coaxial therewith, a power driven pinion having equally spaced teeth, the spacing between said sets of teeth on said gear being twice the distance between adjacent gears on said pinion, and means for supporting said pinion on a lawnmower with its teeth in a position for meshing with the blades of said mower.

3. An attachment for a lawnmower having a central rotary shaft supporting a plurality of elongated cutting blades providing outwardly directed helically extending cutting edges equally spaced from each other around and spaced outwardly of said shaft comprising: a gear, means for securing said gear rigid with such shaft and blades and coaxial with such shaft, the outer diameter of said gear to the tip circle of its teeth being substantially equal to the diameter of a cylinder adapted to be developed by such cutting edges of said blades upon rotation of said blades about the axis of a shaft adapted to support such blades, the teeth of certain adjacent pairs thereof on said gear being spaced apart for receiving one of said blades between each of such adjacent pairs in spaced relation thereto.

4. An attachment for a lawnmower having a central rotary shaft supporting a plurality of elongated cutting blades providing outwardly directed helically extending cutting edges equally spaced from each other around and spaced outwardly of said shaft comprising: a gear, means for securing said gear rigid with said shaft and blades and coaxial with said shaft, the outer diameter of said gear to the tip circle of its teeth being substantially equal to the diameter of a cylinder adapted to be developed by said cutting edges upon rotation of said blades about said axis, the teeth of certain adjacent pairs thereof on said gear being spaced apart for receiving one of said blades between each of such adjacent pairs in spaced relation thereto, a pinion, a shaft supporting said pinion for rotation, and means for securing said last mentioned shaft and said pinion on said lawnmower in a position with the teeth of said pinion adapted to mesh with the teeth of said gear and with said blades when said gear is secured rigid with said blades, the member of said cutting blades and the teeth on said gear being arranged in pairs spaced apart a greater distance than the spacing between the teeth of each of said last mentioned pairs for positioning of one of said blades between each of said last mentioned pairs.

5. An attachment for a lawnmower having a central rotary shaft supporting a plurality of elongated cutting blades providing outwardly directed helically extending cutting edges equally spaced from each other around and spaced outwardly of said shaft comprising: a gear, means for securing said gear rigid with said shaft and blades and coaxial with said shaft, the outer diameter of said gear to the tip circle of its teeth being substantially equal to the diameter of a cylinder adapted to be developed by said cutting edges upon rotation of said blades about said axis, the teeth of certain adjacent pairs thereof on said gear being spaced apart for receiving one of said blades between each of such adjacent pairs in spaced relation thereto, a pinion, a shaft supporting said pinion for rotation, and means for securing said last mentioned shaft and said pinion on said lawnmower in a position with the teeth of said pinion adapted to mesh with the teeth of said gear and with said blades when said gear is secured rigid with said blades, means for securing said pinion on said last mentioned shaft for rotation of said shaft relative thereto upon a predetermined resistance to the rotation of said pinion with said last mentioned shaft.

6. An attachment for a lawnmower having a central rotary shaft supporting a plurality of elongated cutting blades providing outwardly directed helically extending cutting edges equally spaced from each other around and spaced outwardly of said shaft comprising: a gear, means for securing said gear rigid with said shaft and blades and coaxial with said shaft, the outer diameter of said gear to the tip circle of its teeth being substantially equal to the diameter of a cylinder adapted to be developed by said cutting edges upon rotation of said blades about said axis, the teeth of certain adjacent pairs thereof on said gear being spaced apart for receiving one of said blades between each of such adjacent pairs in spaced relation thereto, a pinion, a shaft supporting said pinion for rotation and means for securing said last mentioned shaft and said pinion on said lawnmower in a position with the teeth of said pinion adapted to mesh with the teeth of said gear and with said blades when said gear is secured rigid with said blades, the said means for securing said last mentioned shaft on said lawnmower including a motor connected with said last mentioned shaft and a bracket means for supporting said motor rigidly on said lawnmower.

7. An attachment for a lawnmower having a plurality of elongated revolvable supported cutting blades providing outwardly directed helically extending cutting edges equally spaced from each other around and spaced outwardly of the axis of revolution of said blades comprising: a pinion having blade-engageable pairs of teeth adapted to mesh with said blades, a shaft supporting said pinion for rotation therewith, a motor connected with said shaft for driving the same, means for securing said motor, shaft and pinion onto said lawnmower in a position with the gears of said pairs in mesh with said blades upon rotation of said pinion for revolving said blades, pinion engaging means adapted to be secured rigid with said blades in positions between adjacent pairs of said blades for engagement with said pinion upon rotation of the latter, and means for so securing said pinion engaging means rigid with said blades.

8. An attachment for a lawnmower having a plurality of elongated revolvable supported cutting blades providing outwardly directed helically extending cutting edges equally spaced from each other around and spaced outwardly of the axis of revolution of said blades comprising: a pinion having blade-engageable pairs of teeth adapted to mesh with said blades, a shaft supporting said pinion for rotation therewith, a motor connected with said shaft for driving the same, means for securing said motor, shaft and pinion onto said lawnmower in a position with the gears of said pairs in mesh with said blades upon rotation of said pinion for revolving said blades, pinion engaging means adapted to be secured rigid with said blades in positions between adjacent pairs of said blades for engagement with said pinion upon rotation of the latter, and means for so securing said pinion engaging means rigid with said blades, said pinion being of relatively soft, resilient flexible material, and friction means for securing said pinion on said shaft and for permitting relative rotation between said shaft and said pinion upon a predetermined resistance against said pinion to its said rotation with said shaft.

9. An attachment for a lawnmower having a plurality of elongated revolvable supported cutting blades providing outwardly directed helically extending cutting edges equally spaced from each other around and spaced outwardly of the axis of revolution of said blades comprising: a pinion having blade-engageable pairs of teeth adapted to mesh with said blades, a shaft supporting said pinion for rotation therewith, a motor connected with said shaft for driving the same, means for securing said motor, shaft and pinion onto said lawnmower in a position with the gears of said pairs in mesh with said blades upon rotation of said pinion for revolving said blades, said pinion having other pairs of teeth between said blade engageable pairs of teeth, pinion engaging means adapted to be secured rigid with said blades spaced between the latter for meshing with said other pairs of teeth upon rotation of said pinion, and means for so securing said pinion engaging means rigid with and spaced between said blades.

10. An attachment for a lawnmower having a plurality of elongated revolvable supported cutting blades providing outwardly directed helically extending cutting edges equally spaced from each other around and spaced outwardly of the axis of revolution of said blades comprising: a pinion having blade engageable pairs of teeth adapted to mesh with said blades, a shaft supporting said pinion for rotation therewith, a motor connected with said shaft for driving the same, means for securing said motor, shaft and pinion onto said lawnmower in a position with the gears of said pairs adapted to mesh with said blades upon rotation of said pinion for revolving said blades, said pinion having other pairs of teeth between said blade-engageable pairs of teeth, pinion engaging means adapted to be secured rigid with said blades spaced between the latter for meshing with said other pairs of teeth upon rotation of said pinion, and means for so securing said pinion engaging means rigid with and spaced between said blades, said pinion being normally planar and of flexible, resilient, relatively soft composition material, pinion holding means on said shaft in frictional engagement with opposite sides thereof around its axis yieldably holding said pinion dished with its teeth projecting obliquely outwardly relative to the axis of said shaft.

11. In combination with a wheel mounted lawnmower having ground wheels supporting it for movement over the ground and a rotatable shaft supporting a plurality of pairs of elongated cutting blades providing outwardly directed helically extending cutting edges equally spaced from each other around and spaced outwardly of said shaft; a gear having equally spaced pairs of equally spaced teeth, means for securing said gear rigid with said blades and coaxial with the said shaft at a point between the ends of said blades, the outer ends of the teeth of said gear projecting from said shaft substantially the same distance as said cutting edges and each of said pairs of teeth being spaced between each adjacent pair of said blades with said blades spaced from the teeth adjacent thereto the same distance as the spacing between the teeth of each pair thereof, a motor, means for supporting said motor on said lawnmower adjacent to said blades, a pinion connected with said motor for driving thereby, the teeth of said pinion being in mesh with the teeth of said gear and with said blades.

References Cited in the file of this patent

UNITED STATES PATENTS 1,241,762     Pratt _____ Oct. 2, 1917